United States Patent Office 3,396,196
Patented Aug. 6, 1968

3,396,196
PROCESS FOR PRESERVING AQUEOUS
FORMALDEHYDE SOLUTIONS
Phillip A. Greene, Petersburg, Va., assignor to Allied
Chemical Corporation, New York, N.Y., a corporation
of New York
No Drawing. Filed Dec. 19, 1963, Ser. No. 331,926
8 Claims. (Cl. 260—606)

This invention relates to a process for preserving aqueous formaldehyde solutions against acid build-up and the formation of polymers.

Aqueous solutions of formaldehyde undergo a number of degradative changes when stored for substantial periods of time. The principal changes which may take place on storage are (1) polymerization and precipitation of the polymer and (2) formation of formic acid, either by the Cannizzaro reaction or by air oxidation, or by oxygen present in the solution.

Acid formation is usually not a serious problem if the formaldehyde solution is stored for short periods at normal room temperatures. However, acid formation increases rapidly with increased temperatures. Polymer precipitation can be prevented by maintaining the formaldehyde solutions at elevated temperatures above the minimum temperatures at which precipitation takes place for the particular formaldehyde concentration. This temperature is higher for the higher formaldehyde concentrations. For example, a 37% low methanol formaldehyde will not precipitate polymer if kept at 21° C. for 1 day, at 27° C. for 25 days or at 32° C. for sixty days. A 50% solution will remain clear for about 25 days at 55° C. Acid formation therefore is particularly troublesome for solutions of 37% to 70% or higher, which contain little or no methanol (which is a stabilizer against precipitation) and must be kept at elevated temperatures to prevent precipitation of polymer. Concentrated formaldehyde solutions, and especially those of above 45% concentration, are therefore usually stored at temperatures about 50°–65° C. to insure clarity and lack of precipitation of polymer for at least about a three-week period (21 days) which is usually amply sufficient to permit time for short storage periods at the supplier's warehouse, for shipping, and for storage by the consumer prior to eventual use.

The quantity of formic acid normally present in freshly prepared formaldehyde solution is very small, often less than 0.02%. However, the utility of formaldehyde for certain uses, for example in the production of melamine- and urea-formaldehyde resins, is dependent on maintaining the formic acid content exceedingly low, preferably less than about 0.07%.

Formaldehyde solutions have been stabilized in the past against acid formation during storage by the addition thereto of phosphoric acid and water soluble phosphates. However, the presence of phosphates in formaldehyde solutions is undesirable in certain end uses of the formaldehyde, notably in the manufacture of urea-formaldehyde resins.

Another method of stabilizing formaldehyde solutions against acid development is by the addition thereto of aliphatic hydroxy-, amino-, and hydroxyamino acids together with hexamethylene tetramine. This method has the disadvantage that formaldehyde solutions so treated are not stable when stored in the presence of air, and they still contain an impurity which may interfere with certain formaldehyde end uses.

An object of the present invention is to provide a process for storing formaldehyde solutions at elevated temperatures wherein acid build-up during such storage is greatly reduced over that which normally occurs at such temperatures.

Another object of the invention is to provide a process for preserving aqueous formaldehyde solutions against acid build-up during storage at elevated temperatures, without the addition of any stabilizer or other additive thereto.

These and other objects are accomplished according to my invention, wherein aqueous formaldehyde solutions which have been substantially freed of dissolved or entrained oxygen are maintained under an atmosphere of an oxygen-free gas, inert to formaldehyde, at temperatures between about 50° C. and about 70° C. under at least a slight positive pressure during the desired storage period.

Formaldehyde solutions, as normally manufactured, by the reaction of methanol and air, are distilled to remove excess methanol and treated, for example with ion-exchange resin, to remove other impurities including formic acid, the latter usually being reduced to a value of not more than about .02%. If proper precautions have been taken in the manufacturing operations such formaldehyde solutions are virtually free of dissolved or occluded oxygen and usually contain not more than about 5 parts per million, often no more than about 2 parts oxygen per million parts of solution. In other cases, the formaldehyde solutions may still contain substantial traces of oxygen after distillation, or may pick up oxygen at some stage in the manufacturing process in spite of precautions to exclude it. I have found that the presence of even traces of oxygen appears to strongly catalyze the Cannizzaro reaction resulting in formic acid build-up in formaldehyde solutions containing dissolved oxygen.

Formaldehyde solutions emerging from the distillation columns and purification system, and which contain no more than about 5 parts per million of oxygen, can be preserved according to my invention by storing under a blanket of an oxygen-free gas, inert to formaldehyde, at elevated temperatures and thus are protected from acid build-up over a substantial storage period.

If, however, the formaldehyde solution to be stored contains in excess of about 5 parts per million of oxygen or higher it must be substantially freed from oxygen before blanketing with inert gas. In such cases, aqueous formaldehyde solutions containing between about 37% and 70% formaldehyde, are subjected to the action of a stream of oxygen-free inert gas, flowing in contact therewith for a time not less than about one second, sufficient to reduce the free oxygen content of the formaldehyde solution to not more than about 5 parts per million, preferably to less than about 2 p.p.m., and the resulting substantially oxygen-free formaldehyde solutions are thereafter maintained in contact with said inert, oxygen-free gas under at least slight positive pressure during the desired storage period.

When the formaldehyde solution to be preserved is oxygen-free it may simply be conveyed to storage in tanks or other containers connected to an inert gas line where the tanks are filled to somewhat short of capacity, and the remaining volume is filled with a blanket of inert gas under a slight positive pressure sufficient to maintain a slight outward flow of inert gas through the system, and thereby prevent access of oxygen to the formaldehyde.

I prefer, however, as a precautionary measure, to first purge the formaldehyde solution by subjecting it to a stream of oxygen-free inert gas for at least a short period, as described for oxygen-containing formaldehyde solutions, prior to storage under the inert gas blanket.

Accordingly, in carrying out the process of my invention according to a preferred embodiment, inert gas is brought into contact with the liquid formaldehyde solution in any desired manner, for example, by injecting a stream of the inert gas into the bottom of a vessel of liquid formaldehyde solution for a period at least sufficient to reduce the oxygen in formaldehyde solution to not more than about 5 parts per million, and venting the spent inert gas containing the oxygen stripped from the formaldehyde solution.

It is also preferred, however, to treat the oxygen-containing liquid formaldehyde solution in a continuous manner which can be integrated as a step in the commercial preparation and storage of concentrated formaldehyde solution. Thus, for example, formaldehyde solution, as prepared by reaction of methanol and air, is distilled to remove excess methanol and treated to remove other impurities, including formic acid, the latter being usually reduced to a value of not more than about .02%. In my preferred operation the freshly prepared formaldehyde solution as above described, is passed downwardly through a tower or packed column countercurrent to an ascending stream of oxygen-free inert gas wherein the last traces of oxygen in the formaldehyde solution are removed, down to not more than about 5 parts per million, preferably not more than about 2 p.p.m. Gas flow is preferably in the range between about one and about two volumes of gas per volume of formaldehyde solution.

After "stripping" the formaldehyde solution of oxygen with inert gas, the solution is passed to storage where it is maintained at elevated temperatures and in contact with oxygen-free inert gas to block access of air or other oxygen-containing gas to the storage system. This is readily accomplished either by continuing a flow of inert gas through or in contact with the formaldehyde solution, or preferably, by maintaining the formaldehyde solution under a "pad" or blanket of inert gas under slight positive pressure, for example, of at least about 0.1 p.s.i.g., preferably between about 1 and about 10 p.s.i.g. to maintain a slight outward flow or inert gas from the system. Similar conditions can be maintained not only during storage proper, but also during shipping as in tank cars and the like.

As inert gas, any oxygen free, normally gaseous material, which is non-reactive with formaldehyde, may be used, for example, hydrogen, nitrogen, methane, carbon dioxide, carbon monoxide, etc., or mixtures thereof. Especially useful is the conventional ammonia synthesis gas composed of about 75% hydrogen and 25% nitrogen, and also other formaldehyde plant waste gases resulting from the oxidation-dehydrogenation of methanol to formaldehyde over silver catalyst, and usually having a composition of about 24 parts $H_2$, about 70 parts $N_2$ and about 4 parts $CO_2$ and about 2 parts $CO$.

Another inert gas is conveniently prepared by the controlled combustion of natural gas and typically consists of 2 parts of $H_2$, 86 parts $N_2$, 9 parts $CO_2$ and 3 parts $CO$.

By "oxygen-free" as applied to the inert gas, I mean a gas having a substantially zero partial pressure of oxygen so that it immediately absorbs oxygen from the formaldehyde solution. Such inert gas, therefore, will usually have an oxygen concentration of not more than about 3 parts per million by volume.

The following specific examples further illustrate my invention:

Example 1

Samples of aqueous formaldehyde solution containing 50.7% formaldehyde, 1.36% methanol and .013% acidity as formic acid, the balance essentially water, were placed in separate 2 liter glass bottles and designated Samples H, A, B and C respectively, and stored for ten day periods under the different conditions of storage set forth below. Bottles A, B and C were filled with 2 liters of solution in each, bottle H was half-filled with 1 liter of solution.

Sample H was glass stoppered under the existing air atmosphere, for the ten-day test period.

Sample A was closed except for a small gas inlet and was treated by continuously introducing into the bottom of the liquid a small flow of oxygen-free, inert gas mixture composed of approximately 75% hydrogen and 25% nitrogen. Flow was continued for the ten-day test period at a rate of about 1 volume of inert gas per volume of liquid per 24 hours.

Sample B was stored for the same period covered by a blanket of the same inert gas mixture used in treating Sample A, i.e. 75% $H_2$–25% $N_2$ with slight positive pressure of about 0.1 p.s.i.g.

Sample C was treated in the same manner as Sample A, except that air instead of inert gas was bubbled through the solution at the same rate used with Sample A for the ten-day test period.

Results of these tests are shown in Table I below.

TABLE I.—WEIGHT INCREASE IN FORMIC ACID ON STORAGE AT 65° C.

| | Days in Test | Weight percent, HCOOH | Increase in Weight percent, HCOOH |
|---|---|---|---|
| Sample: | | | |
| H | 0 | .013 | 0 |
| H | 3 | .028 | .015 |
| H | 5 | .043 | .030 |
| H | 7 | .065 | .052 |
| H | 10 | .102 | .089 |
| A | 0 | .013 | 0 |
| A | 3 | .014 | .001 |
| A | 5 | .016 | .003 |
| A | 7 | .017 | .004 |
| A | 10 | .020 | .007 |
| B | 0 | .013 | 0 |
| B | 3 | .024 | .011 |
| B | 5 | .026 | .013 |
| B | 7 | .028 | .015 |
| B | 10 | .030 | .017 |
| C | 0 | .013 | 0 |
| C | 3 | .025 | .012 |
| C | 5 | .033 | .020 |
| C | 7 | .044 | .031 |
| C | 10 | .069 | .056 |

Acid build-up rates, calculated from the data in Table I, in average daily percent point increase in weight percent formic acid for the cumulative days in the test are shown in Table II below.

TABLE II.—AVERAGE PERCENT DAILY ACID BUILD-UP RATES

| Days in Test | Sample | | | |
|---|---|---|---|---|
| | H | A | B | C |
| 3 | .0050 | .0003 | .0037 | .0040 |
| 5 | .0060 | .0006 | .0026 | .0040 |
| 7 | .0074 | .0006 | .0021 | .0044 |
| 10 | .0089 | .0007 | .0017 | .0056 |

The results of the above example strongly suggest that the Cannizzaro reaction is catalyzed by traces of dissolved oxygen. These data show an average increase in weight percent formic acid of 0.0007 per day over a ten-day period for the stripped solution (Sample A). This presumably is the rate due to the Cannizzaro reaction in the absence of dissolved oxygen. Unstripped solution shielded from further oxygen exposure by an inert gas pad shows an average daily acid build-up of 0.0017 weight percent for the same ten-day period (Sample B).

Sample C through which air was swept shows a lower acid build-up than the stoppered Sample H stored under a pad of air, but a greater acid development than continuously stripped or blanketed Samples A and B.

Example 2

Samples of 55% formaldehyde solution initially containing 0.025 and .012 weight percent formic acid, respectively, were stored in glass apparatus, as described in Example 1, Sample A under air atmosphere and Sample B with continuous purging with an oxygen-free inert gas composed of 85.5% nitrogen, 9% carbon dioxide, 3.2% carbon monoxide and 2.3% hydrogen over a twelve-day period, during which time periodic determinations of formic acid were carried out, with the results shown in Table III below.

TABLE III

| Days in test | Sample A | | | | | |
|---|---|---|---|---|---|---|
| | 0 | 2 | 5 | 7 | 9 | 12 |
| Wt. percent HCOOH | 0.025 | .037 | .053 | .064 | .072 | .085 |
| Wt. increase HCOOH | 0 | .012 | .028 | .039 | .047 | .060 |

| Days in test | Sample B | | | | | |
|---|---|---|---|---|---|---|
| | 0 | 2 | 5 | 7 | 9 | 12 |
| Wt. percent HCCOH | .012 | .019 | .021 | .023 | .026 | .034 |
| Wt. increase HCOOH | 0 | .007 | .009 | .011 | .014 | .022 |

Acid build-up rates, calculated as average daily percent point increase in weight percent HCOOH for the cumulative days in the test are shown in Table IV below.

TABLE IV

| Days in Test | Sample A | Sample B |
|---|---|---|
| 2 | .0060 | .0035 |
| 5 | .0056 | .0018 |
| 7 | .0056 | .0016 |
| 9 | .0052 | .0016 |
| 12 | .0050 | .0018 |

This test shows that the rate of acid build-up in the formaldehyde solution is greatly reduced by the presence of a pad of inert gas (Sample B) as compared to the rate of acid build-up in the presence of a pad of air (Sample A).

While the above describes the preferred embodiments of my invention it will be understood that departures may be made therefrom within the scope of the specification and claims.

I claim:
1. The method of preserving an aqueous solution of formaldehyde containing less than about 5 parts per million of free oxygen and less than 0.02% by weight of formic acid and consisting essentially of between about 37% and about 70% by weight of formaldehyde, the balance water, and preserving such solution from rapid acid build-up, which comprises maintaining said formaldehyde solution under an atmosphere of an oxygen-free gas, inert to the solution at temperatures between about 50° C. and about 70° C.

2. The method according to claim 1 wherein the gas is a mixture consisting essentially of hydrogen and nitrogen and is present at a pressure at least slightly in excess of surrounding atmospheric pressure and sufficient to maintain at least a slight outward flow of the gas through the storage system.

3. The method of preserving an aqueous solution of formaldehyde containing from about 37% to about 70% by weight of formaldehyde less than about 5 parts per million of free oxygen and less than 0.02% by weight of formic acid, which comprises passing an oxygen-free gas, inert to the solution, in intimate contact with the said formaldehyde solution until the solution has been substantially freed of reactive gases, including oxygen, and thereafter maintaining said formaldehyde solution under an atmosphere of said oxygen-free gas at a temperature between about 50° C. and about 70° C.

4. The method according to claim 3, wherein the formaldehyde solution, prior to contacting with the gas contains dissolved oxygen in an amount in excess of about 5 parts per million of solution and wherein said gas is at a pressure at least slightly in excess of surrounding atmospheric pressure.

5. The method according to claim 3 wherein the formaldehyde solution is contacted with the gas at a rate of between about 1 volume and about 2 volumes of gas gas per volume of liquid formaldehyde solution per 24 hours.

6. The method according to claim 3 wherein the gas is a mixture consisting essentially of hydrogen and nitrogen.

7. The method according to claim 3 wherein the gas is a mixture consisting essentially of nitrogen, hydrogen and carbon oxides.

8. The method of improving the preserving stability of aqueous concentrated formaldehyde solution, which comprises passing an oxygen-free gas inert to the solution into intimate contact with the solution for a sufficient period to substantially eliminate dissolved oxygen.

References Cited

UNITED STATES PATENTS

| 2,002,243 | 5/1935 | Hinegardner | 260—606 |
| 2,757,131 | 7/1956 | Howlett et al. | 260—604 |
| 2,848,500 | 8/1958 | Funck | 260—606 |
| 2,841,570 | 7/1958 | MacDonald | 260—606 |

OTHER REFERENCES

Walker: "Formaldehyde," 2nd Ed., pp. 74–76, 1953, Reinhold Pub. Co.

LEON ZITVER, *Primary Examiner.*

R. H. LILES, *Assistant Examiner.*